(12) United States Patent
Collado et al.

(10) Patent No.: US 9,529,627 B2
(45) Date of Patent: Dec. 27, 2016

(54) MANAGING MULTIPLE SYSTEMS IN A COMPUTER DEVICE

(71) Applicants: STMicroelectronics (Grenoble 2) SAS, Grenoble (FR); STMicroelectronics Asia Pacific Pte Ltd, Singapore (SG)

(72) Inventors: Raphael Collado, Grenoble (FR); Shivachitta S. Walishetty, Singapore (SG); Ling Yu Cheng, Singapore (SG)

(73) Assignees: STMICROELECTRONICS (GRENOBLE 2) SAS, Grenoble (FR); STMICROELECTRONICS ASIA PACIFIC PTE, LTD., Singapore (SG)

( * ) Notice: Subject to any disclaimer, the term of this patent is extended or adjusted under 35 U.S.C. 154(b) by 64 days.

(21) Appl. No.: 14/219,835

(22) Filed: Mar. 19, 2014

(65) Prior Publication Data
US 2014/0289736 A1  Sep. 25, 2014

(30) Foreign Application Priority Data
Mar. 19, 2013 (EP) .................................. 13305326

(51) Int. Cl.
*G06F 9/46* (2006.01)
*G06F 9/50* (2006.01)
(Continued)

(52) U.S. Cl.
CPC ............. *G06F 9/50* (2013.01); *G06F 3/1423* (2013.01); *G06F 9/5011* (2013.01); *G09G 5/14* (2013.01);
(Continued)

(58) Field of Classification Search
None
See application file for complete search history.

(56) References Cited

U.S. PATENT DOCUMENTS 6,725,456 B1  4/2004  Bruno et al.
7,949,998 B2 *  5/2011  Bleisch .................. G06F 9/455
                                                        713/164
(Continued)

FOREIGN PATENT DOCUMENTS

EP      1 515 229 A2     3/2005
WO   2009/155463 A2    12/2009

OTHER PUBLICATIONS

Le Goater et al., "Making Application Mobile Under Linux," Linux Symposium, vol. 1, Ottawa, Ontario Canada, Jul. 19-22, 2006, pp. 347-368 (23 pages).
(Continued)

*Primary Examiner* — Gregory A Kessler
(74) *Attorney, Agent, or Firm* — Seed IP Law Group LLP

(57) ABSTRACT

Resources of multiple systems are managed in a computer device. A first processing system having a set of dedicated resources also has a resource manager to manage at least one of the resources. The first processing system is prevented from directly accessing the resources without authorization. A second processing system, connected to the set of dedicated resources, has a supervisor application to grant control to individual resources to the resource manager of the first processing system. A computer program is executed in the first processing system. The supervisor application grants control of at least one resource to the resource manager of the first processing system in a way that is transparently to the computer program executing in the first processing system.

14 Claims, 7 Drawing Sheets

(51) Int. Cl.
*G06F 3/14* (2006.01)
*G09G 5/14* (2006.01)
*G09G 5/36* (2006.01)

(52) U.S. Cl.
CPC ....... *G09G 5/363* (2013.01); *G06F 2209/5011* (2013.01); *G09G 2360/127* (2013.01)

(56) References Cited

U.S. PATENT DOCUMENTS

| | | |
|---|---|---|
| 2003/0229794 A1 | 12/2003 | Sutton, II et al. |
| 2005/0188088 A1 | 8/2005 | Fellenstein et al. |
| 2005/0246708 A1 | 11/2005 | Turner et al. |
| 2008/0127292 A1 | 5/2008 | Cooper et al. |
| 2010/0281102 A1 | 11/2010 | Chinta et al. |
| 2010/0312966 A1 | 12/2010 | De Atley et al. |
| 2011/0138473 A1 | 6/2011 | Yee et al. |
| 2011/0145926 A1 | 6/2011 | Dalcher et al. |
| 2011/0148891 A1* | 6/2011 | Paquette ............... G06F 3/1438 345/531 |
| 2011/0231550 A1 | 9/2011 | Murray et al. |
| 2012/0210333 A1 | 8/2012 | Potter et al. |
| 2014/0289748 A1 | 9/2014 | Collado et al. |
| 2014/0289807 A1 | 9/2014 | Collado et al. |

OTHER PUBLICATIONS

Noordende et al., "Secure and Portable Confinement of Untrusted Programs," 2002, 14 pages.
Osman et al., "The Design and Implementation of Zap: A System for Migrating Computing Environments," Department of Computer Science, Columbia University, USENIX Association, 5$^{th}$ Symposium on Operating Systems Design and Implementations, Dec. 2002. 16 pages.
Office Action dated Sep. 30, 2015, for corresponding U.S. Appl. No. 14/218,623, 9 pages.
European Search Report, dated Aug. 22, 2013, for European Application No. 13305326.4, 3 pages.
European Search Report, dated Nov. 6, 2013, for European Application No. 13305325.6, 3 pages.
European Search Report, dated Nov. 19, 2013, for European Application No. 13305324.9, 3 pages.
U.S. Appl. No. 14/218,623, filed Mar. 18, 2014, Raphael Collado et al.
U.S. Appl. No. 14/218,467, filed Mar. 18, 2014, Raphael Collado et al.

* cited by examiner

MANAGING MULTIPLE SYSTEMS IN A COMPUTER DEVICE

BACKGROUND

Technical Field

The present disclosure relates to managing multiple systems in a computer device.

Description of the Related Art

There are many computer devices available nowadays, including for example, tablets and smartphones wherein a user can install and launch applications at their selection. Applications are generally launched based on an operating system of the computer device. Computer devices generally support a single operating system, although it is in principle possible to load more than one operating system onto a computing device.

Applications can be run directly in an operating system, or can be run within downloaded clients, for example, a browser client.

With multiple applications launched in a single computing device, it is necessary to manage resources for each application within the constraints of the computing device.

BRIEF SUMMARY

According to the present disclosure, there is provided a computer device comprising: a first processing system comprising a resource manager for managing resources when executing a computer program in the first processing system, and delivering an output of execution of the program via an output resource; a second processing system connected to a set of resources dedicated to the first processing system, the second processing system comprising a supervisor application having access to the set of resources and connected to deliver the resources to the resource manager of the first processing system whereby the first processing system has access to the set of resources only via the supervisor application wherein the output resource for use by the first processing system is selected by the supervisor application of the second processing system transparently to the computer program.

Embodiments provide an environment wherein two processing systems are implemented on the same computing device. Each processing system is substantially in principle self-contained and can comprise for example, an operating system in which applications can be executed. If the first processing system was run in the computing device by itself, its resource manager would be capable of accessing the resources of the computer system and managing those resources as between applications launched within the first processing system in an autonomous fashion. That is, the first processing system constitutes in itself a framework for executing applications on the computer device. According to the described embodiments of the present disclosure, however, the first processing system does not have permission to directly access the resources of the computer device. This provides a first level of security of the first processing system when provided as an operating framework in the computer device. This allows a computer device in principle to install an unknown framework (e.g., first processing system) such that it does not have access to the resources of the computer device. Access to resources required for the execution of applications in the first processing system is provided by the second processing system, and particularly by the supervisor application in the second processing system.

Embodiments of the invention are applicable in the context where the output resource is a graphical resource. For example, the output resource can comprise a virtual frame buffer for holding graphics data output from the computer program and intended to drive a display. The virtual frame buffer can be managed by the supervisor application in a memory space dedicated to receiving the output of execution of the computer program.

The second processing system can comprise a frame buffer for holding graphics data from one or more applications executed in the second processing system for driving a display. The supervisor application can generate output data for this frame buffer. The supervisor application can be operable to control the display to create an opening on the display wherein the data output from the computer program drives the display within the opening to display said data. In that case, the opening can be created by the supervisor application through the frame buffer. The data output from the computer program drives the display via the virtual frame buffer.

That is, portions of the display are driven from the frame buffer of the second processing system while a portion of the display is driven from the virtual frame buffer dedicated to the output of the computer program in the first processing system.

The computer program can consider that it is driving a full screen display. In fact, however, transparently to the computer program, the output of the execution of the program is displayed on a portion of a full screen, rather than the full screen itself.

In addition, the concept underlying embodiments of the present invention can be applied to resources including a general processing unit and an audio/video decoder. The advantages can be usefully achieved in the context where the resources are hardware resources.

Embodiments also comprises a method of managing resources in a computer device in which is installed a first processing system comprising a resource manager, and a second processing system connected to a set of resources dedicated to the first processing system, wherein the first processing system is not authorized to access directly the set of resources, the method comprising: the supervisor application delivering at least one resource from the set of resources to the resource manager of the first processing system, whereby the first processing system has access to the set of resources only via the supervisor application, wherein the output resource for use by the first processing system is selected by the supervisor application of the second processing system transparently to a computer program executed in the first processing system.

Embodiments also provide a computer product in the form of a set of computer instructions in a transitory or non-transitory (e.g., volatile or non-volatile) media, the instructions when executed carrying out the method as herein above.

BRIEF DESCRIPTION OF THE SEVERAL VIEWS OF THE DRAWINGS

For a better understanding of the present disclosure and to show how the same may be carried into effect reference will now be made by way of example to the accompanying drawings. Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
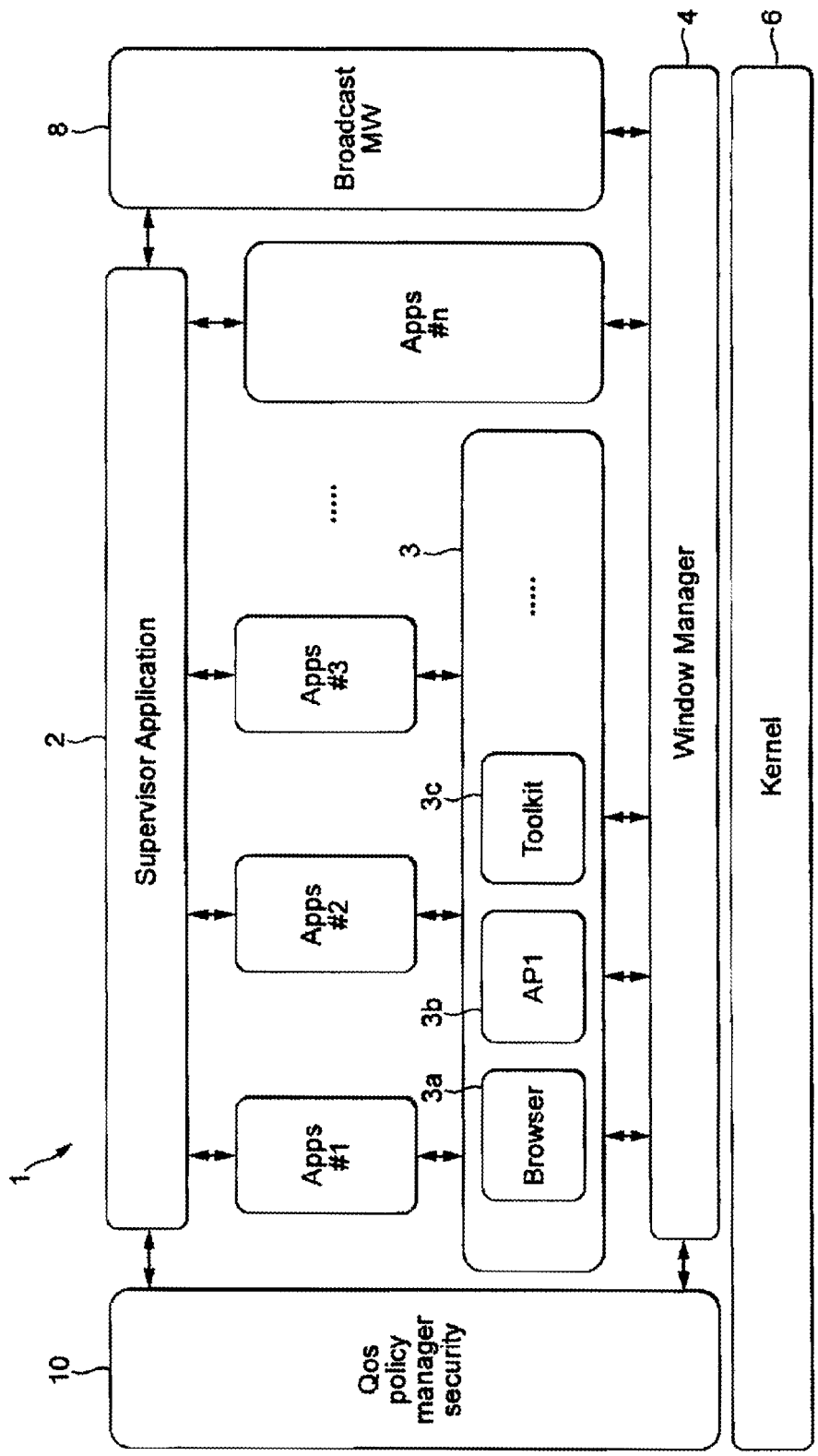
FIG. 1 is a schematic block diagram of the overall architecture of a processor system.

FIG. 1 is a schematic block diagram of the overall architecture of a processor system for executing a number of applications. The processor system comprises a number of hardware components interacting with each other and a supervisor application 2. The supervisor application 2 carries out a number of meaningful functions which will be described later. In the architecture diagram of FIG. 1, principle connections to other components of the architecture are illustrated. The supervisor application 2 is connected to a plurality of applications, labeled "Apps #1", "Apps #2", "Apps #3", . . . A first group of applications (illustrated as Apps #1, Apps #2, Apps #3) are executed based on environments which are shown diagrammatically in volume 3. The environments include, for example, a browser environment 3*a*, a graphics API (Application Programming Interface) 3*b*, a tool kit 3*c*, etc. A second set of applications (labeled Apps #n in FIG. 1) run directly in the open system of the architecture. Applications can be "trusted" or "untrusted". Untrusted applications are executed in containers. Each untrusted App is launched in its own container. A container is a wrapper for the application that interfaces with inputs and outputs. One particular property of an untrusted application in a container is that it has no privilege to access resources. All of the applications interface with the supervisor application 2 as denoted by the respective arrows at the top of each application block. Some applications interface with the environments shown in volume 3. Other applications interface directly with a window manager 4. The window manager 4 is executed on a kernel 6. The window manager 4 communicates with a broadcast middleware (MW) module 8, which is an externally provided application considered to be trusted and which also interfaces directly with the supervisor application 2. A QoS (quality of service) policy manager security module 10 provides a quality of service for the broadcast MW module 8. It also communicates with the window manager 4 and the supervisor application 2. The module 8 is responsible for external communications with the system, that is, for receiving input data and delivering output data to and from the Apps.

There is a set of trusted applications and a set of untrusted applications. Among trusted applications, there are the supervisor application and also the broadcast middleware. One example of an untrusted application could be a browser because it has access to the web. Each application has its own window, which is managed by a window manager (described later). The supervisor is the master of the window manager whereas other applications are slave. Each application communicates with the supervisor and window manager using a mechanism based on a unique identifier for each application.

Figure 2:
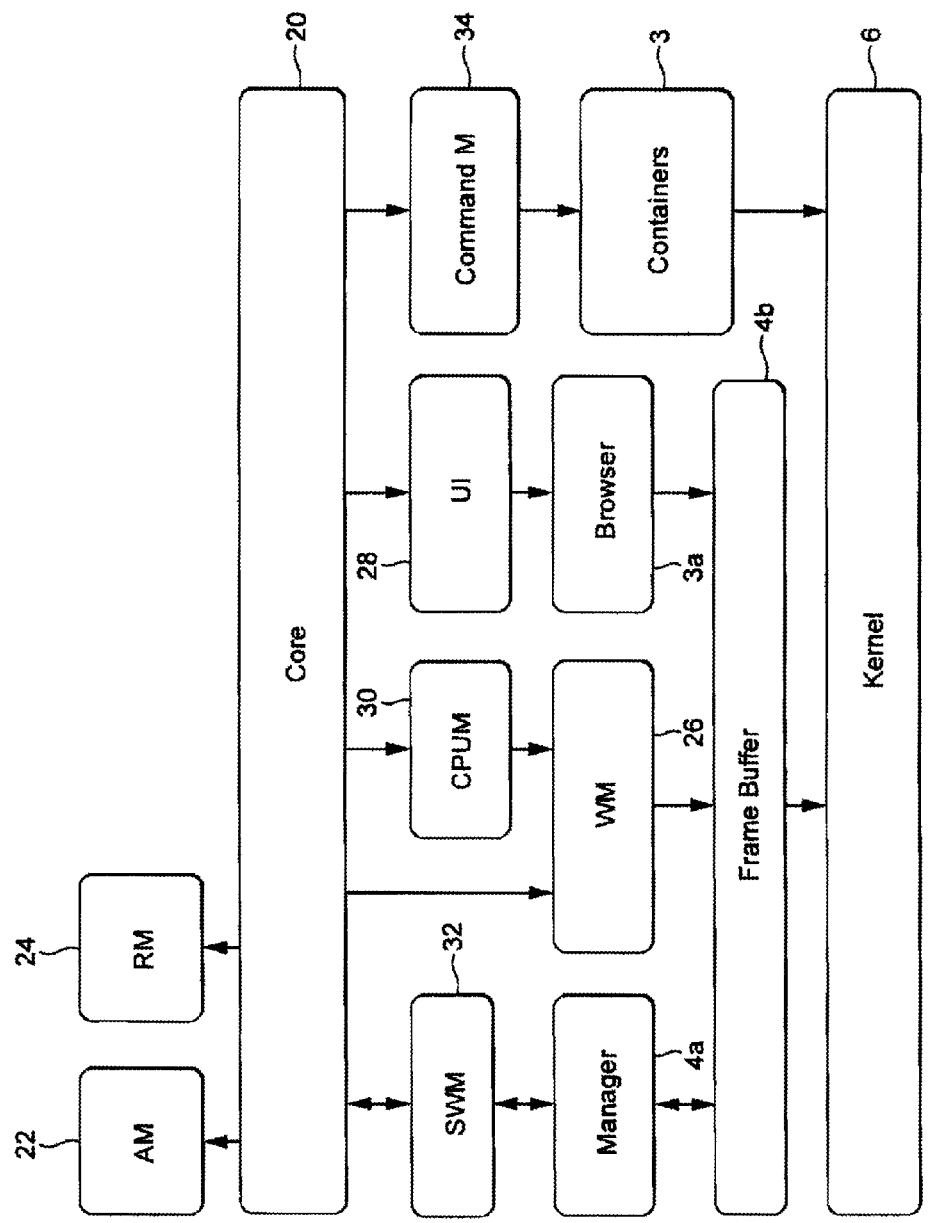
FIG. 2 is a schematic diagram of software components of the system.

FIG. 2 is a block diagram of parts of the architecture of FIG. 1, which implement prominent components of the processor system. FIG. 2 illustrates a supervisor core 20, which uses information from various modules and then decides on the execution of user operation and user interface (UI) coordination. It also manages the QoS policy based on grouping processes/applications according to their resource requirements. An application manager 22 is connected to the core 20. The application manager is responsible for installing various applications (for example, TV, video, music, photo, etc.). Each application has attributes which include:

Started/not started;
Trusted/untrusted;
Resources required, etc.

The application manager is responsible for maintaining an application list and providing an interface to access this list to the core 20. The concept of trusted/untrusted will be explained in more detail hereinafter.

A resource manager 24 defines the various shared resources an application can use. These can for example be physical resources such as the communication resource, e.g., territorial/satellite/cable tuner, video instances, graphics display ports (e.g., GDP2), etc. In any physical system, access to resources is inherently limited and it is the responsibility of the resource manager to manage the limited resources so that each application can function effectively. Before launching, an application will acquire the resources that it needs for its proper operation before it can be launched. This is accomplished through the resource manager. The resource manager maintains the resource list and provides an interface to the core 20 to access this list.

A windows manager 26 is connected to the core 20 and communicates directly with a frame buffer 4*b* which forms part of the window manager 4. In FIG. 2, the window manager 4 is shown as two separate components: a manager 4*a* and a frame buffer 4*b*. The window manager 4 (and its components 4*a*, 4*b*) can be a known window manager system, cooperating with the kernel 6 in a known way to control a display. The windows manager 26 which forms part of the supervisor application 2 provides a special display control function which will be described more fully later. In brief, it maintains and draws four separate windows on a display screen via the frame buffer 4*b*. It also provides an interface to display text for warning messages and displays a CPU status. A user interface module 28 operates under the control of the core 20 and can control the browser environment 3*a* to draw an application launch bar.

Figure 7:
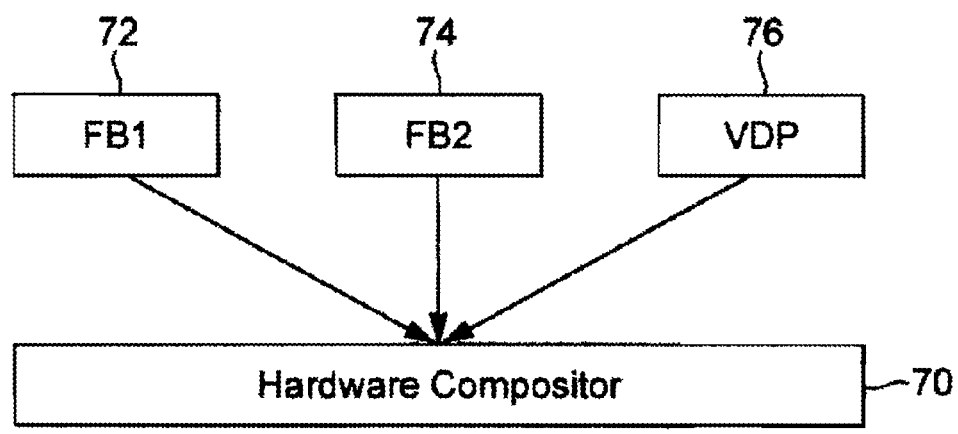
FIG. 7 is a schematic block diagram illustrating operation of a hardware compositor.

In an alternative embodiment shown in FIG. 7, a mechanism creates a hole in a window and handles the display inside the window by some hardware components. A hardware compositor component 70 manages the composition between the output of the frame buffer and those components. Two frame buffers 72,74 can be mixed together by this hardware compositor. A video plan 76 can also be mixed in. Thus, the four separate windows are not necessarily managed only by the frame buffer.

A CPU monitoring module 30 is responsible for grabbing the CPU status periodically and that status can be displayed through the windows manager 26. A wrapper module 32 is executed on top of the manager 4*a* of the window manager 4. It provides a linking interface between code executed in the manager 4*a* and in the core 20. This allows different computing environments to be interconnected through the wrapper.

A command module 34 is similarly provided as an interfacing module between the core 20 and applications executing in an application environment as shown in volume 3. As described in more detail later, volume 3 can be considered to comprise containers for untrusted applications.

Figure 3:
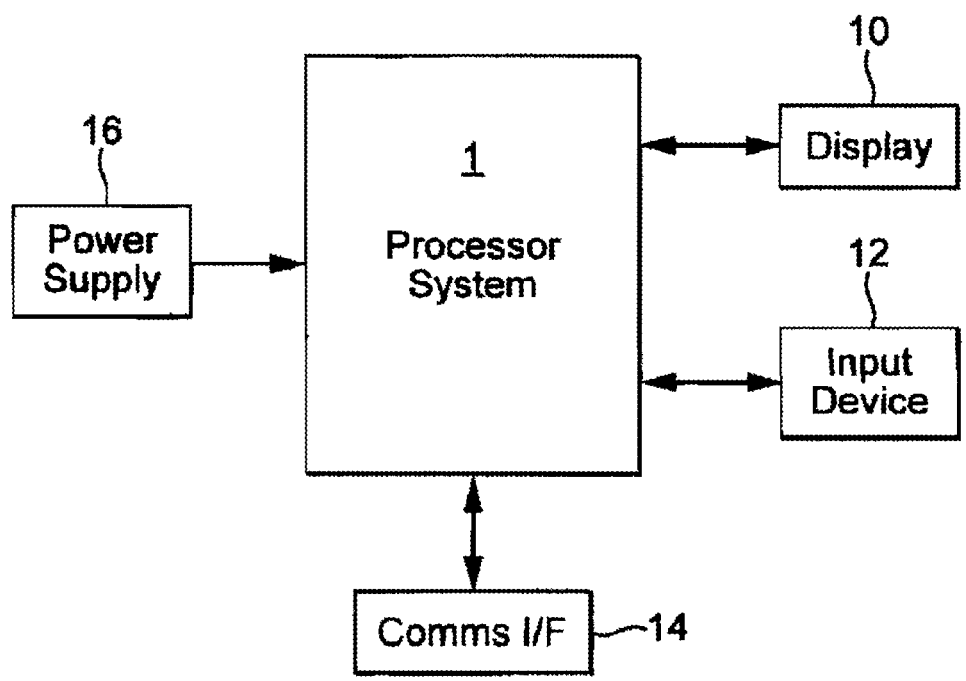
FIG. 3 is a schematic block diagram of a device incorporating the processor system.

FIG. 3 shows a block diagram of a physical device in which the processor system can be implemented. The processor system is denoted 1. The device includes a user interface which incorporates a display 10 and an input device 12, such as a keyboard or mouse, etc. The device can also be equipped with a communications interface 14 and a power supply 16. The device can be any kind of user device, including without limitation personal computer (PC), laptop, tablet, mobile phone, etc. The communications interface 14 and power supply 16 constitute examples of resources which may be used by an application being executed by the processor system. In one embodiment, the processor system includes a hardware compositor component 70 which can handle various display plans, e.g., for an HDMI output two frame buffers and two video plans.

Figure 4:
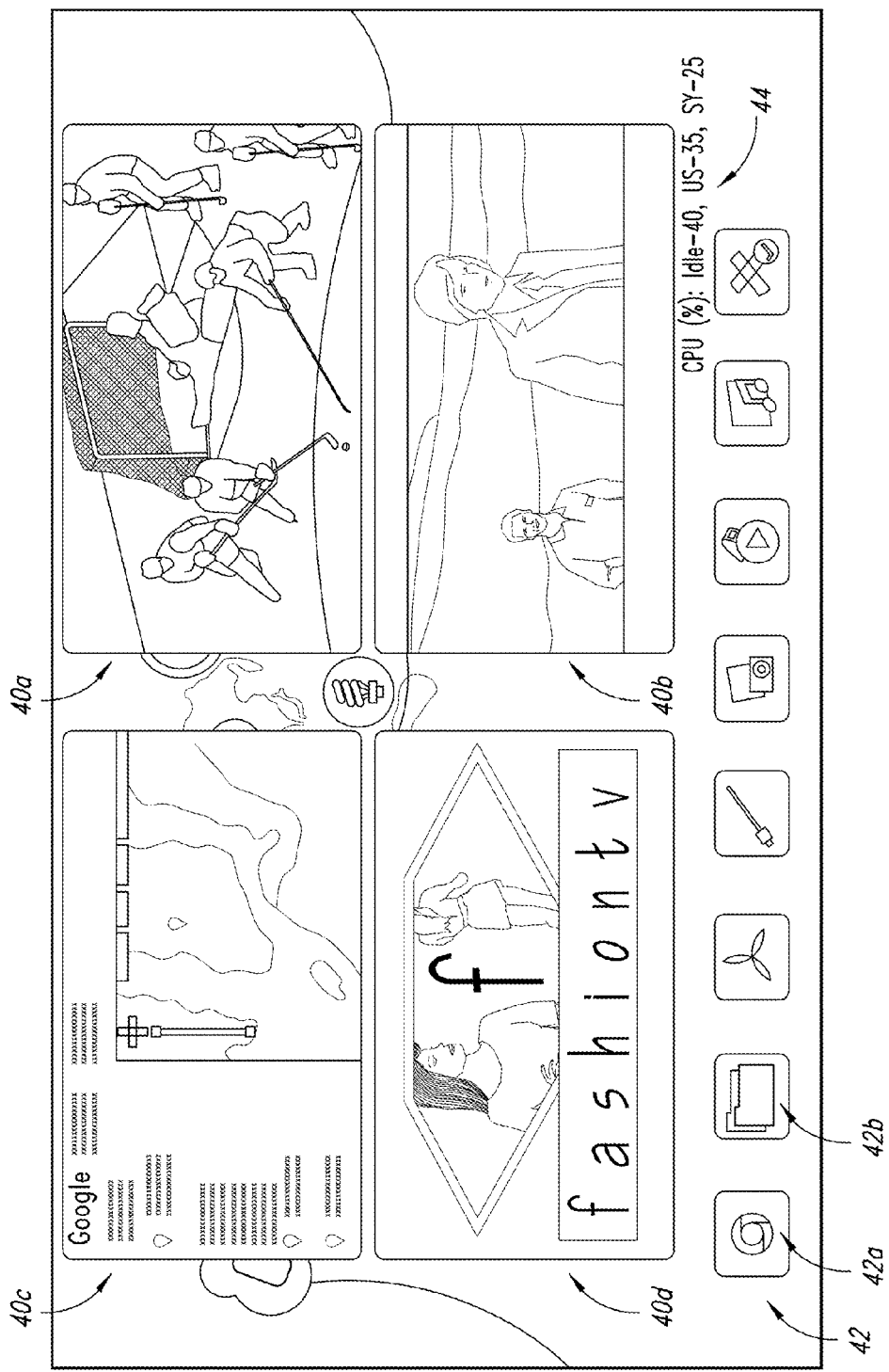
FIG. 4 is a screenshot showing the operation of the display.

FIG. 4 shows an example of a display which can be created by the windows manager 26 in conjunction with the frame buffer 4b. Four windows, 40a, 40b, 40c, 40d are "drawn" on the display, each window displaying the output of an application which is being executed by the device. In addition (arrow 44) the monitor CPU status is displayed. Reference numeral 42 denotes the application bar which is launched by the UI module 28 via the browser 3a. The application bar shows an icon for each application that can be selected by a user to be executed by the device. These icons are denoted 42a, 42b, etc.

As mentioned earlier, a hardware compositor 70 can drive the display with two frame buffer and two video plans mixed together.

Each application constitutes a program or code sequence which is executed by a CPU forming part of the processor system. The architecture described herein provides a secure run time environment for multiple applications which in particular allow advantage to be taken of a variety of different application frameworks. The architecture does not itself provide a new application framework, but provides the infrastructure and tools to facilitate the build of such a framework and/or to make it easier to integrate legacy middleware along with an existing application framework. A first concept supported by the architecture described herein is to denote an application as trusted or untrusted. This is determined during installation of an application. On installation, the application manager 22 checks the application certificate. If the certificate is valid the application is regarded as trusted, else it is regarded as untrusted. Trusted applications are loaded and executed "normally", that is directly between the supervisor application 2 and the window manager 4. They have access privileges to directly access resources required for their execution: these resources are managed by the resource manager 24, which also manages resources for untrusted applications but through the supervisor application. In contrast, untrusted applications are started in a container which provides an environment that is capable of isolating processes from the main system and limiting the resources usage, thus providing a certain level of security from malicious programs. The concept of a container is known from the open source environment of Linux, where untrusted applications are started in a Linux container as a non-root user. Resource usage is provided in the Linux context via the c group mechanism (where c group is a control group representing a collection of processes bound by the same criteria). An alternative construction is offered by UNIX in the form of Logical Domains (LDOMs).

The processor system described herein uses the concept of containers. A container identifier identifies the container itself. An application identifier identifies the application. By hosting untrusted applications in a respective container, a first level of security is provided. The architecture allows a number of different application environments to be hosted. When the manager 4a detects that a user has selected an application to be launched at the display 10, the wrapper 32 intercepts the launch process and advises the core 20 to determine the status of the application that has been selected. All selected applications are considered in the first place to be trusted and so have an identifier which would denote a trusted status. When the core 20 in conjunction with the application manager 22 detects that the application is not trusted, it sets a container identifier to a non-trusted identifier and allocates an application identifier associated with the container identifier. Moreover, the browser executable is not called directly with a start command. There are two possibilities mentioned herein for allowing the application to access resources, even though it is untrusted. In a first possibility, a script file is called to run a container for the browser, noting that the container identifier is untrusted. The script file calls a client before running the browser executable. Although the container is started as untrusted, the client needs trusted privileges to obtain resources, for example, an IP address or dynamic access to hardware resources like audio and video decoders. This can be achieved by setting an application identifier bit for the client beforehand, indicating a trusted status for the client (even if not for the browser executable or the application which will be run behind the client). This allows the browser executable to be started as untrusted in the container, and able to obtain an IP address dynamically using the client. According to the second possibility, which is more secure, the core 20 can run a check for available IP addresses prior to starting the container. It can then use this IP address and statically configure the container before starting it. In this case, it removes the requirement to run the client with trusted privileges within a container and is therefore more secure.

Note that for applications run inside a container, process identifiers which are allocated within a container are unique only within the container itself. This can create a difficulty when applications are launched substantially simultaneously. Under usual circumstances, if a user launches trusted applications A and B together, both applications A and B will start at their own pace in a common environment. The manager 4a will detect that the applications are required to be launched, trigger the launch function and the new process identifiers are captured together with a unique application identifier. This identifier is the identifier which is used for applications to communicate with one another. It is also used to identify applications in the frame buffer. As the process identifier is unique in the common environment for each newly captured process identifier, it can determine whether the process identifier belongs to application A or application B and update the application manager for future references.

However, if a user launches untrusted application A (which will launch in a container), and untrusted application B (which will launch in a container), both applications A and B will again start at their own pace. When an application starts to execute, it obtains a process identifier from its operating environment (in this case a container) and supplies it to the manager 4a. However, in this case, when the launch process is triggered at the manager 4a, based on the newly captured process identifier, the core 20 is unable to determine whether the new process identifier belongs to application A or application B as the process identifier is unique only within the container itself (and not between containers).

This difficulty is overcome in the following way. Applications which are selected more or less simultaneously by a user are sequentially launched by restricting user control in the following manner. If a user launches an application A, any application B will not be allowed to start regardless whether it is trusted or untrusted until a launch command for application A implemented at the manager 4a causes a new process identifier value to be captured. As at this time, it is sure that the process is for application A, the process identifier is updated in the application manager accordingly. A unique application ID is stored as well. So in any future reference in subsequent launch commands, the unique ID is used as the identifier.

An application can launch multiple processes, each having a process identifier sequentially generated by the application (unique within a container for untrusted applications). These process identifiers are held in association with the unique identifier at the superior module.

If no launch command which captures a new process identifier value occurs within ten seconds, it is assumed that an error has occurred and application A will be stopped. This will allow the user to launch any application B.

Figure 5:
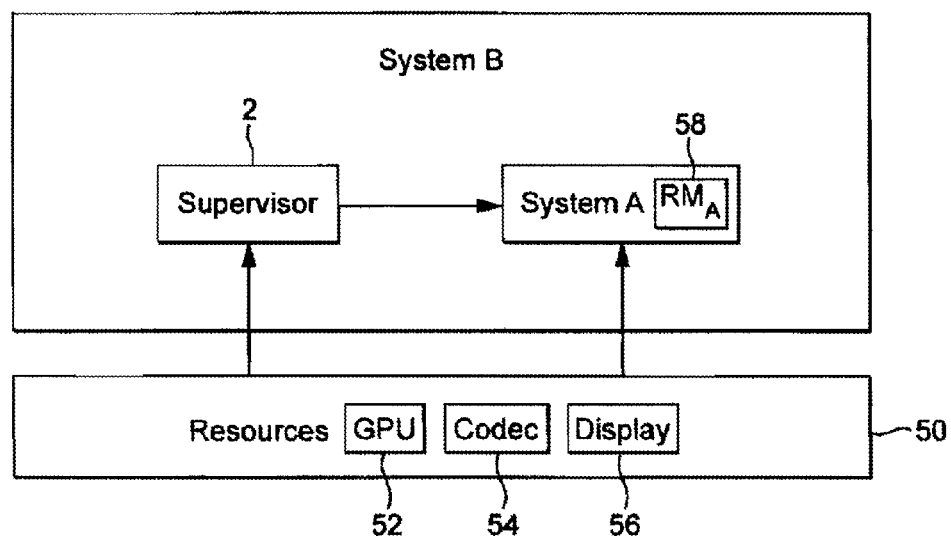
FIG. 5 is a schematic block diagram of a system of resource management.

FIG. 5 is a block diagram of a first system (labeled system A in FIG. 5), which operates within a second system (labeled system B in FIG. 5). Both system A and system B can access resources denoted by block 50. The resources 50 can comprise software and hardware components which are used for operation of both system A and system B. The resources can include for example, a general processing unit 52, audio/video decoders 54 and a display 56. System A is substantially self-contained and in particular contains its own resources manager $RM_A$. Within system A the resource manager 58 would normally manage the resources for system A, including its display resources and input/out resources. For example, if system A is operating in a device of the type shown in FIG. 3, a resource manager would manage output to the display 10 and inputs from the input device. 12. In this context, system A is a set of program components which execute on a platform to deliver a service via the resources and using the resources. For example, system A can be an operating system. In accordance with the earlier described embodiments, system A can be started as an environment for an application in a container such as shown in volume 3. The resource manager 58 within system A would normally be capable of controlling the hardware resources it needed. In particular, it would be capable of managing the graphical rendering/composition of any applications which were run on it, and could be constructed to run on full screen devices.

Utilizing the architecture described earlier, in the embodiment of FIG. 5, the resource manager 58 within system A does not manage the resources applicable for system A. Instead, these are managed by the resource manager of system B. Thus, system B represents an architecture similar to that described in FIGS. 1 and 2. A virtual frame buffer is implemented by dedicated memory space which interacts directly with the kernel. The virtual frame buffer has a memory space dedicated to the management of the screen on the display 56 as governed by system A. This memory space is isolated from the rest of the system, and is controlled in a dedicated fashion by the supervisor application 2. The operation of the supervisor module allows the display of system A to be controlled using the hardware resources available to system B. This is accomplished through the resource manager 24. Using the windows manager 26 and hardware compositor, the display output from system A can be drawn into one of the four windows on the display 10 (as shown in FIG. 4), even though system A considers that it is operating in full screen mode.

The window manager creates a hole in a window. Then the display is managed by the hardware compositor 70, as an overlay solution. The supervisor is responsible to create the window and the hole then to program the hardware compositor through the virtual frame buffer, and it is transparent for system A. System A acts as if it is displaying on a single window of a frame buffer.

Figure 6:
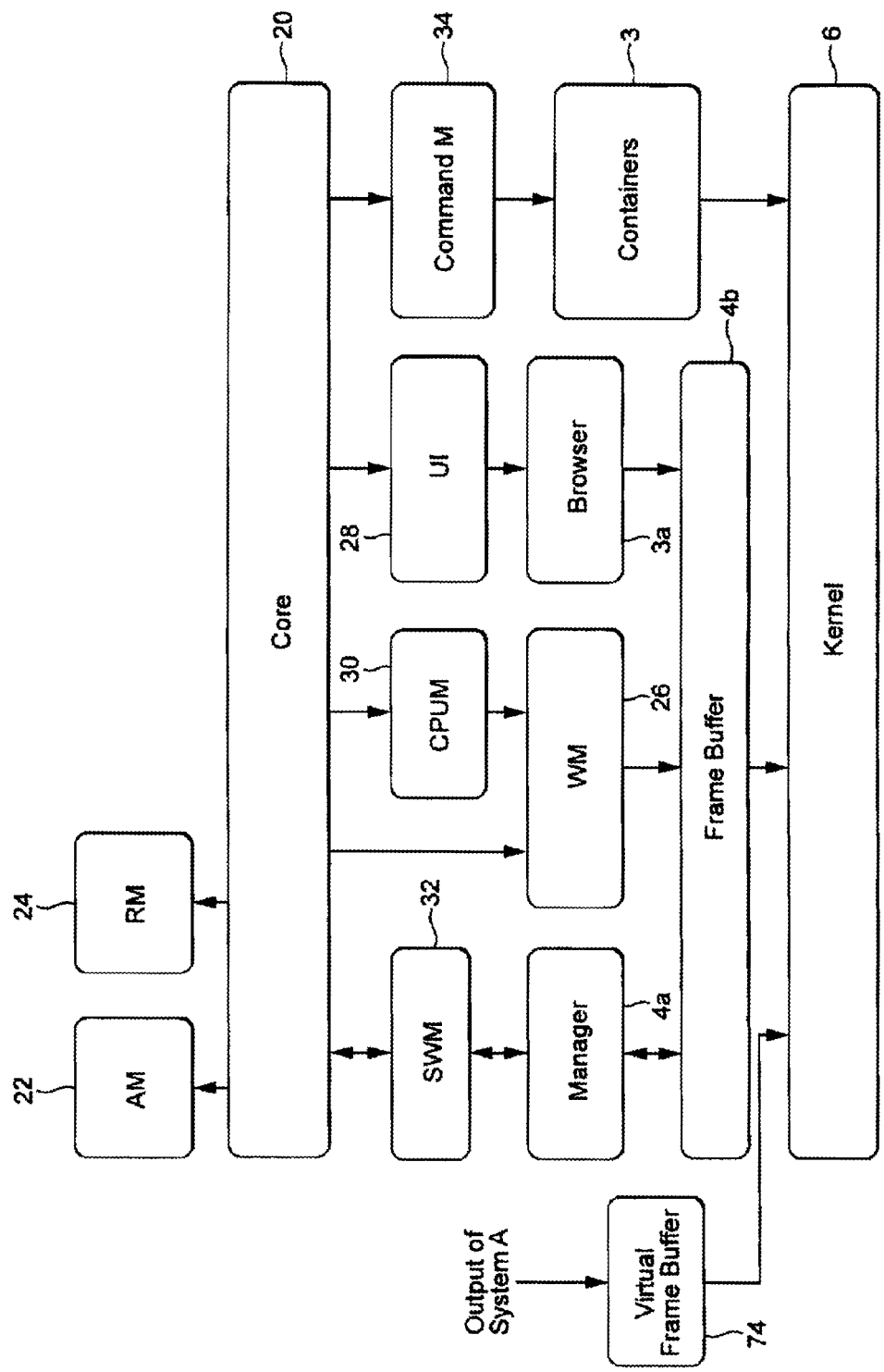
FIG. 6 is a schematic block diagram of a processor system architecture with a virtual frame buffer.

FIG. 6 is a schematic block diagram showing the relationship between the core 20 and a virtual frame buffer 74 as implemented by dedicated memory space. This is a schematic diagram only to illustrate the relationship.

FIG. 7 is a schematic diagram showing the relationship between first and second (virtual) frame buffers 72, 74 and a video plan 76. The frame buffers can be used in the following way to achieve the result described above. Data generated by the supervisor application is displayed through the first frame buffer FB1 72. That is, data from the supervisor application is output to the first frame buffer for driving the display through the kernel. At this level (in the first frame buffer) a hole is created for the output data from system A so that content below the first frame buffer can be shown in that hole. For example, the hole can take the appearance on the display as a rectangular-shaped window, similarly to the windows shown in FIG. 4 for displaying different applications. In this context, the word "hole" denotes an area of the display screen with no data to fill it in the frame buffer creating the hole, in this case the first frame buffer FB1 72.

System A then drives the virtual frame buffer 74 as allocated to it by the supervisor application. The virtual frame buffer 74 FB2 is below FB1, so the final output which drives the display via the kernel is the composite of the contents of FB1 and FB2, as managed by the hardware compositor 70. The supervisor application allocates the virtual frame buffer resource FB2 to system A when an application is launched in system A that will access to the display as a resource. The supervisor application can also be configured to monitor the application and to detect when the size of the application has changed. The application can then drive the kernel to change the size of the virtual frame buffer.

The above described embodiments of the present disclosure provide a processor system which delivers a toolbox that improves time to market allowing different stack porting for dedicated applications. The toolbox gives the flexibility to run concurrently several applications and interface frameworks (for example the different frameworks as shown in volume 3). The toolbox further provides support for secure content between applications, based on the unique application identifier.

It will be appreciate that the embodiments have been described only by way of example. Other variants may be implemented by a person skilled in the art given the disclosure herein. The scope of the invention is not limited by the described embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer device, comprising:
   a display;
   a first processing system having at least one processing core configured to execute a first computer program stored in a memory while a second computer program stored in the memory is concurrently executing, the first processing system having a resource manager configured to manage at least one resource and configured to deliver program execution output from both the first computer program and the second computer program via an output resource, wherein the output resource is a graphical resource that includes a first virtual frame buffer configured to hold displayable graphics data from the first computer program and a second virtual frame buffer configured to hold displayable graphics data from the second computer program;
   a set of resources dedicated to the first processing system wherein the set of resources includes the output resource; and
   a second processing system coupled to the set of resources, the second processing system having a supervisor application configured to grant control to individual resources of the set of resources to the resource manager of the first processing system, wherein the first processing system has access to the individual resources only after the supervisor application has granted control of the individual resources, wherein control of the output resource is granted by the supervisor application to the first processing system transparently to the first computer program, wherein the first and second virtual frame buffers are managed by the supervisor application in a memory space dedicated to receiving the program execution output, wherein the second processing system is configured to execute the second computer program, wherein the second frame buffer is configured to hold displayable graphics data from the second computer program executed in the second processing system, and wherein a first portion of the display is driven by the displayable graphics data from the first computer program in the first virtual frame buffer and a second portion of the display is driven by the displayable graphics data from the second computer program in the second frame buffer.

2. A computer device according to claim 1, wherein the displayable graphics data from the first computer program is formatted for presentation on a full screen, and wherein presentation of the displayable graphics data from the computer first program on a portion of the display is transparent to the computer program.

3. A computer device according to claim 1, wherein the set of resources includes a General Processing Unit (GPU) and an audio/video decoder (CODEC).

4. A computer device according to claim 1, wherein the set of resources includes hardware resources.

5. A computer device according to claim 1, wherein the output resource includes a video plan arranged to cooperate with a hardware compositor configured to drive the display.

6. A computer device according to claim 1, wherein the supervisor application is operable to control the display to create an opening on the display, and wherein the program execution output is graphically presented within the opening.

7. A method to manage resources in a computer device comprising:
   providing a display;
   providing a first processing system, the first processing system having a resource manager configured to manage at least one resource of a set of resources, the set of resources dedicated to the first processing system;
   preventing the first processing system from directly accessing resources of the set of resources without authorization;
   providing a second processing system, the second processing system connected to the set of resources, the second processing system having a supervisor application configured to grant control to individual resources of the set of resources to the resource manager of the first processing system;
   executing a first computer program in the first processing system;
   executing a second computer program in the second processing system, execution of the second computer program concurrent with the execution of the first computer program;
   granting, by the supervisor application, control of the at least one resource of the set of resources to the resource manager of the first processing system, wherein the first processing system has access to resources of the set of resources only via the supervisor application, wherein the at least one resource is selected by the supervisor application of the second processing system transparently to the computer program executing in the first processing system, wherein the at least one resource is a graphical resource that includes a first virtual frame buffer configured to hold displayable graphics data from the first computer program and a second virtual frame buffer configured to hold displayable graphics data from the second computer program, wherein the first and second virtual frame buffers are managed by the supervisor application in a memory space dedicated to receiving program execution output, wherein the second frame buffer is configured to hold displayable graphics data from the second computer program executed in the second processing system, and wherein a first portion of the display is driven by the displayable graphics data from the first computer program in the first virtual frame buffer and a second portion of the display is driven by the displayable graphics data from the second computer program in the second frame buffer.

8. A method according to claim 7, comprising:
   managing the first virtual frame buffer with the supervisor application in a memory space dedicated to receiving output data from the first computer program.

9. A method according to claim 7, comprising:
   providing a hardware compositor; and
   compositing, with the hardware compositor, data in the first virtual frame buffer and the second frame buffer.

10. A method according to claim 7, comprising:
    detecting, with the supervisor application of the second processing system, a launch of the first computer program in the first processing system; and
    allocating the at least one resource from the set of resources to the first computer program when the launch is detected.

11. A method according to claim 10, comprising:
    detecting, with the supervisor application, a change in size of the first computer program; and detecting, with the supervisory program, a change in capability of the allocated at least one resource in accordance with the detected change in size.

12. A non-transitory computer program product having stored thereon a set of computer instructions, the computer instructions configured to carry out a method comprising:

executing a first computer program with a first processing system;

executing a second computer program in a second processing system, execution of the second computer program concurrent with the execution of the first computer program;

executing a resource manager with the first processing system, the resource manager configured to manage at least one resource of a set of resources dedicated to the first processing system;

preventing the first processing system from directly accessing any resources of the set of resources dedicated to the first processing system without authorization;

executing a supervisor application with the second processing system;

granting, by the supervisor application, control of individual resources of the set of resources dedicated to the first processing system to the resource manager of the first processing system, wherein the granting of control is transparent to the first computer program executing in the first processing system, wherein the at least one resource is a graphical resource that includes a first virtual frame buffer configured to hold displayable graphics data from the first computer program and a second virtual frame buffer configured to hold displayable graphics data from the second computer program, wherein the first and second virtual frame buffers are managed by the supervisor application in a memory space dedicated to receiving program execution output, wherein the second frame buffer is configured to hold displayable graphics data from the second computer program executed in the second processing system, and wherein a first portion of a display is driven by the displayable graphics data from the first computer program in the first virtual frame buffer and a second portion of the display is driven by the displayable graphics data from the second computer program in the second frame buffer.

13. A non-transitory computer program product according to claim 12 having stored thereon a set of computer instructions, the computer instructions configured to carry out a method further comprising:

formatting the displayable graphics data from the first computer program for presentation on a full screen wherein driving the first portion of the display is transparent to the first computer program.

14. A non-transitory computer program product according to claim 12 having stored thereon a set of computer instructions, the computer instructions configured to carry out a method further comprising:

creating, with the supervisor application, an opening on the display; and presenting the displayable graphics data from the first computer program within the opening.

* * * * *